United States Patent
Baldischweiler

(10) Patent No.: US 8,983,072 B2
(45) Date of Patent: Mar. 17, 2015

(54) PORTABLE DATA CARRIER FEATURING SECURE DATA PROCESSING

(75) Inventor: Michael Baldischweiler, München (DE)

(73) Assignee: Giesecke & Devrient GmbH, Munich (DE)

( * ) Notice: Subject to any disclaimer, the term of this patent is extended or adjusted under 35 U.S.C. 154(b) by 1787 days.

(21) Appl. No.: 11/920,258

(22) PCT Filed: May 11, 2006

(86) PCT No.: PCT/EP2006/004457
§ 371 (c)(1),
(2), (4) Date: Jan. 30, 2008

(87) PCT Pub. No.: WO2006/120001
PCT Pub. Date: Nov. 16, 2006

(65) Prior Publication Data
US 2009/0016532 A1 Jan. 15, 2009

(30) Foreign Application Priority Data
May 12, 2005 (DE) .......................... 10 2005 022 019

(51) Int. Cl.
H04L 9/00 (2006.01)
G07F 7/10 (2006.01)
G06Q 20/34 (2012.01)
G07F 7/08 (2006.01)

(52) U.S. Cl.
CPC ............ *G07F 7/1008* (2013.01); *G06Q 20/341* (2013.01); *G07F 7/084* (2013.01); *G07F 7/1016* (2013.01)
USPC ........... 380/277; 713/189; 713/193; 713/194; 713/150; 713/162; 713/172

(58) Field of Classification Search
CPC ....................................................... H04L 9/08
USPC ................................................................ 380/277
See application file for complete search history.

(56) References Cited

U.S. PATENT DOCUMENTS 5,623,637 A * 4/1997 Jones et al. .................... 711/164
5,745,571 A * 4/1998 Zuk ............................... 380/285
(Continued)

FOREIGN PATENT DOCUMENTS

DE 196 26 337 C2 10/1998
EP 0 811 204 B1 9/1999
(Continued)

OTHER PUBLICATIONS

Thomas S. Messerges et al., Examining Smart-Card Security under the Threat of Power Analysis Attacks, IEEE Transactions on Computers, vol. 51, No. 5, May 2002, pp. 541-552.*
(Continued)

*Primary Examiner* — Luu Pham
*Assistant Examiner* — Canh Le
(74) *Attorney, Agent, or Firm* — Workman Nydegger

(57) ABSTRACT

Disclosed is a method for securely processing data in a portable data carrier. Said method is characterized by the following steps: a) the data to be processed is requested; b) the data to be processed is encoded; c) the encoded data is temporarily stored in a buffer storage zone of the data carrier; d) the temporarily stored, encoded data is decoded by means of a decoding key; and e) the decoded data is processed.

28 Claims, 3 Drawing Sheets

(56) References Cited

U.S. PATENT DOCUMENTS

| | | | |
|---|---|---|---|
| 5,809,241 A * | 9/1998 | Hanel et al. | 709/206 |
| 6,484,937 B1 * | 11/2002 | Devaux et al. | 235/380 |
| 6,658,566 B1 * | 12/2003 | Hazard | 713/172 |
| 6,668,326 B1 * | 12/2003 | Sella et al. | 726/6 |
| 6,715,078 B1 * | 3/2004 | Chasko et al. | 713/193 |
| 7,921,305 B2 * | 4/2011 | Uchida | 713/194 |
| 8,051,257 B2 * | 11/2011 | Gorobets et al. | 711/156 |
| 2002/0013940 A1 | 1/2002 | Tsukamoto et al. | |
| 2002/0032858 A1 * | 3/2002 | Nakano et al. | 713/159 |
| 2002/0054513 A1 * | 5/2002 | Kao | 365/189.01 |
| 2002/0056081 A1 * | 5/2002 | Morley et al. | 725/1 |
| 2002/0114461 A1 | 8/2002 | Shimada et al. | |
| 2003/0056099 A1 * | 3/2003 | Asanoma et al. | 713/172 |
| 2004/0013266 A1 * | 1/2004 | Giraud | 380/1 |
| 2004/0215964 A1 * | 10/2004 | Barlow et al. | 713/172 |
| 2005/0122399 A1 * | 6/2005 | Silverbrook et al. | 348/207.2 |

FOREIGN PATENT DOCUMENTS

| | | |
|---|---|---|
| EP | 0 914 640 B1 | 11/2004 |
| JP | S63-211045 A | 9/1988 |
| JP | H08-287205 A | 11/1996 |
| JP | H09-510813 A | 10/1997 |
| JP | 2003-092565 A | 3/2003 |
| JP | 2003-323597 A | 11/2003 |
| JP | 2004-259287 A | 9/2004 |
| JP | 2005-039637 A | 2/2005 |

OTHER PUBLICATIONS

R.E Lennon, Cryptography arichitecture for inofmration security, IBM SYST J, vol. 17, No. 2, 1978, pp. 138-150.*

Search Report of German Patent and Trademark Office regarding German Patent Application No. DE 10 2005 022 019.3, Oct. 4, 2007.

* cited by examiner

PORTABLE DATA CARRIER FEATURING SECURE DATA PROCESSING

FIELD OF THE INVENTION

The invention relates to a method for the secure processing of data in a portable data carrier, in particular in a chip card, and such a data carrier.

BACKGROUND

For processing data by a portable data carrier provided with a processor, which are provided to this data carrier by an external device, the data carrier has write functions, which write the data into a specific memory area of a non-volatile memory of the data carrier, for example into an EEPROM memory of a chip card. This is the case, for example, with chip cards and smart cards, which are used for transactions at a terminal of a point of sale or of a credit institution. Usually, such data are written bitwise on the basis of a memory address into a target file of the data carrier. Such write commands for chip cards standardized according to ISO-IIC 7816-4 are, for example, UPDATE-BINARY and WRITE-BINARY.

In most cases the data provided to the data carrier are not longer than 256 bytes. If the operation of transferring the data onto the data carrier is interrupted, for example by an interruption of the power supply, a memory area of 256 bytes has to be deleted in order to avoid data inconsistencies and to ensure the integrity of the data carrier. This applies in particular to chip cards because data are stored by applying charges on capacitors, and the writing of data bits into the EEPROM memory in case of certain write commands can depend on the bits to be overwritten or the current energy level of the capacitors. Since the most non-volatile (EEPROM) memories are organized in pages of 64 bytes, for the data deletion a time requirement of 3 ms×256/64=12 ms is typical. Such time requirement is still acceptable with contactlessly operated chip cards. But when storing large data records, the time required for deleting the respective memory area can be unacceptably long. For a data record of 8 kilobytes a delete time of already 8192/64×3 ms=384 ms is required.

EP 0 811 204 B1 describes a method for storing data in a chip card, wherein before a processing of the data by the chip card an access authorization is checked and before the check of the access authorization the data are temporarily stored in a memory area provided therefor. EP 0 914 640 B1 discloses the storage and use of security-critical information in a data carrier, wherein the data are protected against unauthorized access by encrypting with temporary keys before they are used. But none of the above prints offers a solution for the problem of a too long delete time in case a write process is interrupted.

Therefore, the invention is based on the problem of proposing a method for the secure processing of data and a corresponding data carrier, wherein the deletion of memory areas is carried out in an accelerated fashion.

SUMMARY

A data carrier according to the present invention comprises at least a processor and a non-volatile memory—usually a rewritable EEPROM memory—as well as a specifically formed processing control executable by the processor. Such processing control requests the data to be processed by the data carrier and supplies them to processing.

But the processing control does not supply the data provided by an external apparatus directly to a processing, for example a password check or PIN check, a signing, or storage in a target memory area, but in a first step deposits them in a temporary memory area formed in the non-volatile memory, in order to effect their processing not until in the second step. In the first step the data are encrypted and temporarily stored in the temporary memory area only in encrypted form, the encryption being carried out by a cryptographic functionality of the data carrier. For processing the data at first the now encrypted data are decrypted by the cryptographic functionality with the help of a cryptographic key and subsequent to this are processed in a decrypted form.

After the processing being entirely completed, the data are still present in the temporary memory, but in an encrypted form, so that they are not readable without decryption key. Therefore, they do not have to be deleted. Instead, they can be deleted at any time, for example when new data are provided to the data carrier for processing. Preferably, the decryption key in the key memory area is deleted immediately after the completion of the data processing. Then there is no possibility at all to access the encrypted data of the temporary memory area.

By temporarily storing encrypted data, a required deletion (e.g. because of an interruption of a data storage process) of the temporarily stored data is unnecessary or at least reduced to the deletion of the pertinent decryption key. Since the decryption keys normally have a constant and normally substantially shorter bit length than the data, deleting or making unusable the temporarily stored data can be carried out fast and effectively by deleting the decryption key.

Preferably, the steps of temporarily storing and decrypting for the immediate further processing are executed immediately one after the other, so that the two steps form a functional whole and in terms of transparency the temporary storing is not apparent for a user of the data carrier. This achieves the result that the data remain readable in the temporary memory only as long as it is necessary for ensuring the data integrity in case of an interruption, since after the processing the encrypted data can be made unreadable by deleting the decryption key, because they are not needed any longer. In this respect the temporary memory area is preferably formed as a selected temporary memory area, and not adapted for storing data in an accessible or addressable form. Preferably, the temporary memory area cannot be accessed by an application or a user, except for the processing control.

In principle, the method can be carried out on every data carrier provided with a computing capacity, but according to the invention on portable data carriers with processor, such as e.g. chip cards, smart cards, PCMCIA cards, secure multimedia cards, USB tokens and the like, in particular in connection with the data transmission between such a data carrier and an external device, such as e.g. a chip card terminal, a point of sale, any other reading device, etc. Here an operating system controlling the mode of operation of the data carrier is stored in a permanent ROM memory, which preferably also comprises the processing control as well as the cryptographic function.

For encrypting and decrypting it is possible to use both a symmetric method and an asymmetric method. In case of a symmetric method the key for encrypting the data on temporarily storing them is the same as the key for decrypting the data on copying them. In case of an asymmetric method these keys are different, but after the processing of the data only the decryption key has to be deleted in order to prevent further accesses to the data in the temporary memory.

During the two-stage processing operation an undesirable interruption can occur during the initial temporary storing or during the final processing. If an interruption occurs during temporarily storing a requested data amount, i.e. at a point of time when the encrypted data are still not completely present in the temporary memory area, the decryption key will be deleted in order to make it impossible to access the incomplete and inconsistent data of the temporary memory area.

Here the decryption key can be stored in a key memory area formed in the non-volatile memory of the data carrier, e.g. in the EEPROM memory of a chip card, or in a volatile memory area, e.g. in the RAM memory of a chip card.

In the first case, when the process of temporarily storing is interrupted, the decryption key is preferably deleted with the help of an active delete operation initiated by the processing control. Such an active delete operation on the one hand can be carried out quasi at the time when the interruption occurs or on the other hand immediately after the interruption has been removed as a basically first operation of the data carrier after the interruption. In contrast to this in the last case, i.e. when the decryption key is present in a volatile RAM memory, it has not necessarily to be actively deleted by the processing control, but it is deleted as a direct consequence of the power failure without an active delete operation initiated by the processing control.

When the processing of the data is interrupted, in principle the processing is completed after the interruption has been removed, and the decryption key is not deleted until the data are completely processed. Here a data inconsistency cannot occur, since the data are already completely present in the temporary memory area and an interrupted processing can be continued or newly started when the power supply is restored.

Normally, on a data carrier a file system is set up in order to structure the stored data and to make them logically addressable. Therefore, in principle, the non-volatile memory of a data carrier can be divided in a memory area provided for a file system and the remaining memory area not organized as a file system. The temporary memory area can either be set up within the file-system memory-area or outside this memory area.

In an especially preferred embodiment the processing of the data comprises a storage of the data in a target file of the data carrier that is accessible by users or applications. Here, the data at first present in an encrypted form in the temporary memory in the subsequent processing step are copied into a target memory area of the non-volatile memory that is reserved for the target file. On copying the encrypted data into the target memory area, the encrypted data are decrypted by the cryptographic functionality with the help of the decryption key, in order to subsequently write them in decrypted form into the target memory area. When the data completely and in decrypted form are present in the target memory area in the target file provided therefor, the decryption key in the key memory area is deleted.

When in this embodiment the temporary memory area is set up within the memory area of the data system, advantageously the temporary memory area is formed as a local memory area associated with the respective target memory area or the respective file. In this solution at least each target file of the data carrier has an own local temporary memory area. But when the temporary memory area is set up outside the data system, it is expedient to set up this temporary memory area as a global memory area, which is available as a temporary memory area to all files or target memory areas and any other processing equally.

The management and set up of the temporary memory area in general is subject to the control of a memory management normally integrated in the operating system of the data carrier, which organizes the temporary memory area dependent on, for example, a segmentation strategy and management strategy. When local temporary memory areas are used, these can also be set up directly as a part of the memory area in the non-volatile EEPROM memory that is reserved for a file, or as memory areas separated therefrom which are associated with the respective target memory areas via logical operations.

Especially preferred the cryptographic decryption key is created at the beginning of a write operation and individually for each write operation by the cryptographic functionality of the data carrier and stored in a non-volatile or volatile memory, so that it is existent only during this one processing operation and before and after this an access to the temporary memory area is not possible.

Likewise, it is possible to create a plurality of keys in advance and to store them in the non-volatile memory, each of these keys being used for exactly one processing operation and deleted thereafter. In case of an asymmetric encryption, for example a (master) encryption key can be used, for which a plurality of individual decryption keys can be created.

Besides arranging the key memory area in a volatile memory, such as e.g. the RAM memory of a chip card, there is, like with the temporary memory area, also a global and a local variant for arranging it in the non-volatile memory. With the global variant a central key memory area is set up outside the file-system memory-area of the EEPROM memory, which is accessed on every write operation. When there exists a global temporary memory area, it is additionally possible to form the global key memory area as a part of the global temporary memory area. When the processing of the data is a copying into a target memory area, local key memory areas can be set up, which especially advantageous are associated with the target memory areas or files as partial areas of possible local temporary memory areas.

The cryptographic functionality can be provided as a software component or as a hardware component. A software solution advantageously can be formed as an operating system routine, while for a hardware solution a cryptographic coprocessor is expedient whose functions are used by the operating system or the write function for encrypting or decrypting data.

Further features and advantages of the invention appear from the following description of various embodiments and alternative embodiments according to the invention in connection with the accompanying Figures.

DETAILED DESCRIPTION OF VARIOUS EMBODIMENTS

Figure 1:
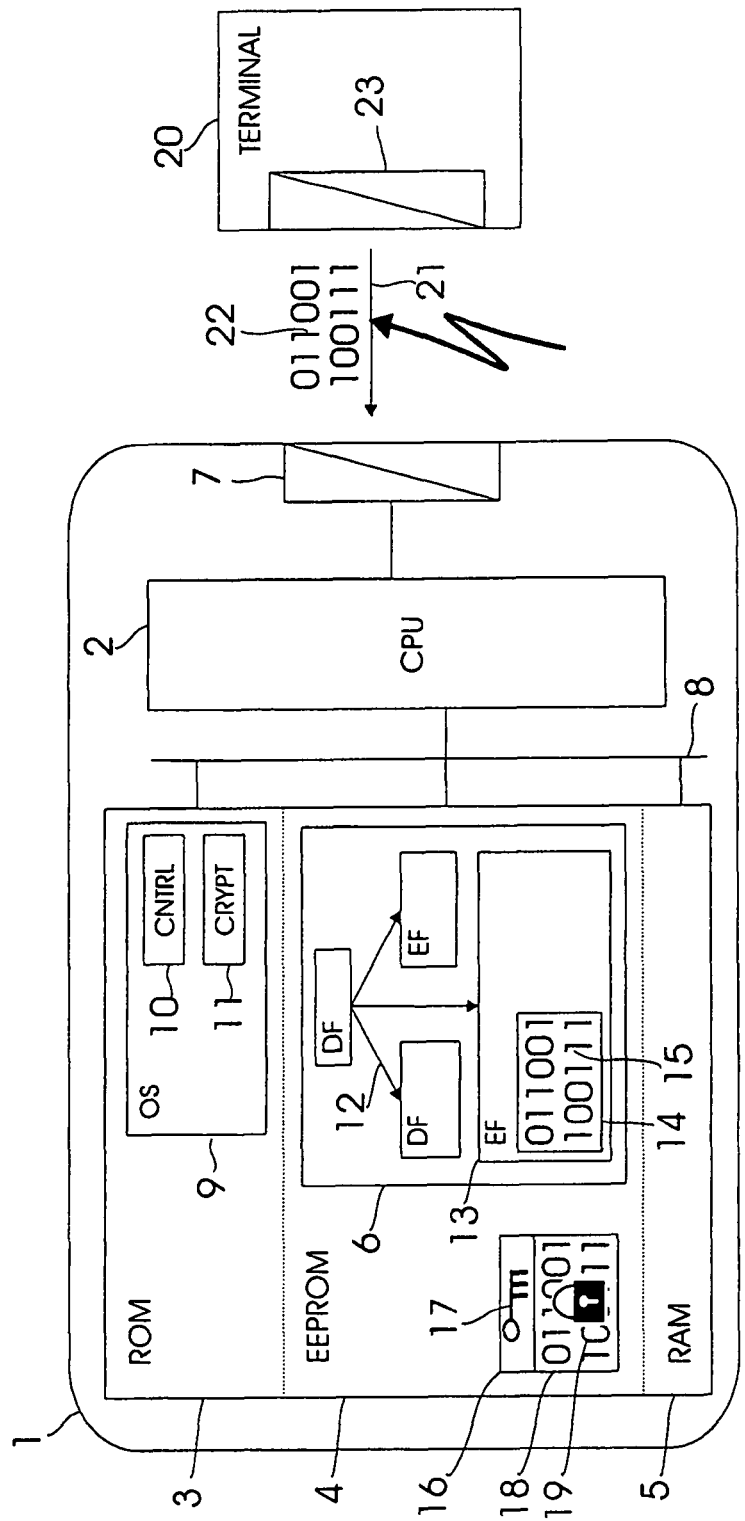
FIG. 1 shows a chip card according to the invention with a global temporary memory and a software cryptographic functionality.

Substantial components of a conventional chip card are, as illustrated in FIG. 1, a processor 2, a memory array 3, 4, 5 and an interface 7 for contacting the chip card 1 with a reading or processing device 20 via a corresponding interface 23 and for permitting a data transfer 21. The communication connection within the chip card 1 is established by a bus system 8. The memory array 3, 4, 5 normally consists of three different memories, a permanent ROM memory 3, a non-volatile and rewritable memory 4, which usually is an EEPROM, but can also be another type of memory, e.g. a flash memory, as well as a volatile RAM main memory 5, whose data are lost as soon as the power supply of the chip card 1 is interrupted.

The operating system 9 of the chip card 1 is stored in the permanent ROM memory 3, where it remains unchanged for the whole lifetime of the chip card 1. It comprises a number of specific commands, which realize elementary chip card functions, e.g. input and output, authentication, memory management, etc. In particular the operating system 9 comprises a processing control 10, which in this embodiment of the invention is formed as a storage function and is used to write data 22 into files 13 in the EEPROM memory 4, which are to be stored on the chip card 1 as a result of a data communication 23 of the chip card 1 with a terminal 20. According to the standard ISO/IEC 7816-4 for example the commands WRITE-BINARY and UPDATE-BINARY represent such write or storage functions. The processing control 10 of the FIG. 1 according to the invention is designed as a storage function, whose mode of operation is sketched by the flow chart of FIG. 2. Moreover, the operating system 9 comprises a cryptographic functionality 11 for encrypting and decrypting data.

Basically, besides storing data in files which are made available to a data carrier and in particular a chip card 1, the invention relates to every possible type of processing data, e.g. subjecting the data to a security-critical check e.g. as a PIN, password or signature, or other types of processing such as e.g. a signing with the help of the data, decrypting, arithmetic or logic processing and the like, wherein it is, circumstances permitting, not necessary to store the data in a file 13 in the EEPROM memory 4, but they can remain in the RAM memory 5. Within the terms of the invention all these processing modes are realized as two-stage processes, consisting of an encrypted temporary storing of the data and the subsequent actual processing of the decrypted data. In the following an especially preferred embodiment of the invention is explained, wherein the processing step consists of copying the data 19 present in an encrypted form in the temporary memory 18 into a file 13 in the EEPROM memory 4 of the chip card 1. But this by no means is to be understood as a restriction of the invention to the storage of data.

Like in conventional computers the data of a chip card 1 are usually organized in a file system 12, which consists of directories (dedicated file; DF file) and data-carrying files (elementary file; EF file), whereas DF files can refer to other files, so that a tree structure is the result. Data 22 to be stored on the chip card 1 are sorted into a certain EF file 13 in the directory tree 12 and thus are written into the memory area 14 of these EF data 13. The exact memory area 14 of the EEPROM memory 4 which is to take up the data 22 to be stored ensues from the actual write command whose transferred values are interpreted by the operating system 9 and transcribed into physical memory addresses within the EEPROM memory 4. This means that the EEPROM memory 4 comprises a specific memory area 6 for the file system 12 and the data 15 stored therein and a memory area located outside this memory area 6, in which other data can be stored.

Figure 2:
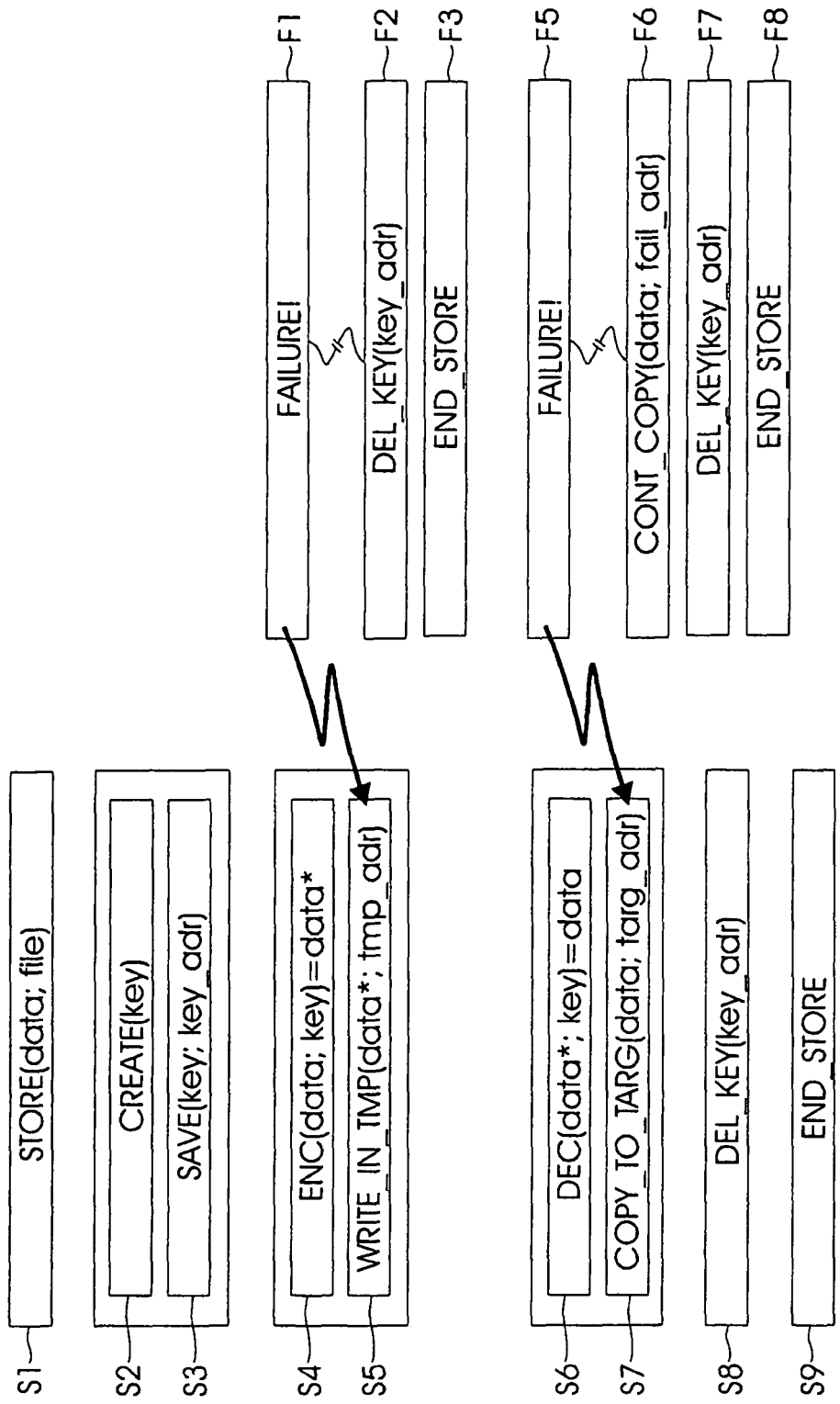
FIG. 2 shows a flow chart of a preferred embodiment of the method according to the invention.

FIG. 2 with steps S1 to S9 shows the uninterrupted sequence of events of a storage process according to the present invention. The commands stated in FIG. 2 do not represent real commands of a specific chip card or of a specific operating system, but are to be understood as pseudocode commands, which only serve as an illustration.

In step S1 a store command STORE is called, which effects the execution of the processing control 10 according to the invention and whose transferred values—the data (data) to be stored and a target file (file)—are interpreted by the operating system 9. So the processing control 10 takes over the control of the data to be stored and requests them. The STORE command S1 can also be understood as a data transmission 21 from an external terminal 20 to the chip card 1. Here, too, the processing control 10 takes over the control of the data 22 and in so far requests them. Instead of an, in terms of memory organization, abstract file name it is also possible that a direct memory address is passed to the STORE command, which addresses the memory area 14 in the EEPROM memory 4 of the chip card 1, in which the respective data are to be stored. Additionally, it can be the case, that besides this offset memory address the number of bytes to be written is also passed, i.e. the size of the data to be stored.

In step S2 a cryptographic key 17 (key) is created by the symmetrically working cryptographic function 11, which in step S3 is stored in a key memory area 16 in the EEPROM memory 4 reserved therefor. With an asymmetric encryption and decryption an encryption key could be immediately dismissed after the encryption in step S3, while the pertinent decryption key 17 is stored in the key memory area 16. For storing the key, the cryptographic key 17 as well as a memory address (key_adr) is passed to the respective SAVE command, which addresses the memory area 16 in the EEPROM memory 4 reserved for cryptographic keys 17, which is preferably formed as a global memory area outside the memory area 6 for the file system 12, as shown in FIG. 1. Then all cryptographic keys 17 created within the framework of the data memory are stored in the same key memory area 16. This is possible, since the keys 17 for each storage process are created individually and are deleted after the completion of the storage operation.

Strictly speaking, with such a global key memory area 16, it is not necessary to pass a memory address key_adr to the SAVE command in step S3, since the constant memory address of the key memory area 16 is already known to the operating system 9.

Subsequent to this in step S4 the data 22 (data) to be stored bitwise are encrypted with the help of the key 17 (key), so that encrypted data 19 (data*) are the result. In step S5 the encrypted data 19 are temporarily stored in the temporary memory 18, the encrypted data 19 and the memory address tmp_adr of the memory area 18 being passed to the temporary memory routine WRITE_IN_TMP.

The data 22 passed to the STORE command in step S1 physically at first are located in the volatile RAM main memory 5 and are readout from there by the encryption routine 11 in step S4. Then the encrypted data can either be stored again in the RAM memory 4 for being used by WRITE_IN_TMP, or they are written into the temporary memory area 18 immediately at their generation (possibly as a data stream) without being completely deposited in the RAM memory (but possibly only in specialized registers or special memories of a cryptographic coprocessor). In the last-mentioned case the steps S4 and S5 or the commands ENC and WRITE_IN_TMP, advantageously, are carried out in a cooperating fashion.

If the memory area 18 is a global memory area as in the embodiment of FIG. 1, a passing of the memory address tmp_adr is not necessary, since the operating system knows the global temporary memory area 18. The embodiment of FIG. 1 further shows, that the key memory area 16 can be formed in a fashion directly integrated in the temporary memory area 18 or adjoining it. This is expedient since the key 17 and the encrypted data 19 always form a functional pair.

After the completion of step S5 the data 22 to be stored are present in encrypted form 19 on the chip card 1 and they can be accessed only by commands formed according to the invention using the cryptographic key 17. Accordingly, in step S6 for preparing the copying into the target memory area 14 the data are decrypted with the help of the cryptographic key 17. In step S7 the data 15 now present in plaintext are written into the final target memory area 14, which is available to the file 13 in the memory area 6 of the EEPROM memory 4. Like the above explained cooperation of the steps of temporary storing S4 and S5, steps S6 and S7 or the commands DEC and COPY_TO_TARG can be advantageously executed in a cooperating fashion, by the data being written into the target memory area 14 immediately with the decryption without them being stored in the RAM memory 4.

For executing the copy step S7 it is possibly necessary to ascertain the memory address targ_adr of the target memory area 14 on the basis of the file name "file" with the help of the operating system 9. This means that with the completion of step S7 the data to be stored in the EEPROM memory 4 exist twofold, in encrypted form 19 in the temporary memory area 18 and in decrypted form 15 in the target memory area 14. But due to the encryption of the data 19 it is not necessary to actively delete the encrypted data 19, it is sufficient to delete the key 17 in step S8. With that an access to the data 19 of the temporary memory 18 is made impossible and the data consistency remains guaranteed. The storage process is properly completed in step S9.

With the complete temporary storing, i.e. with the termination of step S5, the data 22 to be stored for the first time are physically present and complete in the EEPROM memory 4 of the chip card 1. This point of time marks a borderline as to decisions to be taken concerning the error handling in case of an interruption of the power supply or another failure, because if a failure occurs before the completion of the step of temporary storing S5, illustrated by step F1 in FIG. 2, the data 22 to be stored will be present only incomplete and encrypted in the temporary memory area 18 of the chip card 1, so that the storage process cannot be properly completed.

In this case only the consistency of the data can be ensured or recovered, by deleting the already temporarily stored incomplete data. For this purpose in step F2 the cryptographic key 17 is deleted, so that the partial data record stored in an encrypted form before the interruption F1 can no longer be used. Though in step F4 the data storage is completed unsuccessfully, this is without any damage to the data consistency, and the data storage can be repeated by the user, if necessary.

Step F2 of deleting the key 17 can be effected in different ways, dependent on the memory location of key 17. When the key 17, as shown in FIG. 1, lies in the non-volatile memory 4, in case of an interruption F1 of the temporary storing it is deleted by the processing control 10 with the help of an explicitly activated delete operation. Such can be carried out immediately before the interruption F1 or immediately after the removal of the interruption or bringing anew into contact the chip card 1 with the terminal 20. The first case, for example, can be realized in that after the recognition of an interruption by the chip card 1 a possibly present residual voltage in the capacitors is used to delete the cryptographic key still during the quasi emergency running. The second variant, i.e. the deletion of the key 17 immediately after the chip card 1 returned to service, can be realized in that at the beginning of the step of temporary storing S5 a logical flag is set, which is removed only when the step S5 is successfully completed. When returning to service after an interruption F1 the set flag indicates the interruption F1 and the operating system 9 of the chip card 1 can immediately carry out the step F2 of deleting the key 17.

But it is also possible to deposit the key 17 in the volatile RAM memory 5, since it is only temporarily needed. When the temporary storing is interrupted, the key 17 would be deleted immediately following the interruption F1, since the volatile RAM memory 4 loses its data in case of a power failure without an active deletion being necessary.

In case of an interruption F5 after the completion of step S5, i.e. for example during copying S7 the data 19 from the temporary memory area 18 into the target memory area 14, the interrupted copy step S7 can be continued in step F6. Then the copying operation is resumed precisely at the memory address fail_adr, at which the copy operation S7 was aborted. This memory address can be ascertained by the operating system 9, by either temporarily storing memory addresses during step S7 or analyzing the target memory area 14 after the chip card 1 returned to service. Of course, instead of step F6 the original copy step S7 can be repeated without taking into consideration the error address. After a proper completion of step F6 the key 17 is deleted in step F7 and the write process is completed in step F8.

Interruptions of all other steps S1 to S4 or S6, S8, S9 can be treated in the same way, dependent on whether they occur before or after the completion of step S5.

As encryption methods for the present invention in particular symmetric cryptography methods such as DES, AES or their variations are expedient, since for the present invention they have the advantage that they use identical encryption and decryption keys 17. In principle it is also possible to use an asymmetric encryption, for which corresponding different keys are used for the encryption and decryption. In this case for example an invariable master key can be used for encrypting, and individual decryption keys derived from the master key are stored in the key memory 16 for decrypting. Likewise, a plurality of decryption keys can be created in advance, which then are successively used and after being used are deleted. The cryptographic functionality can be provided by an operating system routine 11 as in FIG. 1, or as in FIG. 3 as a hardware solution by a special cryptographic chip 11, e.g. a high-speed triple DES coprocessor.

Figure 3:
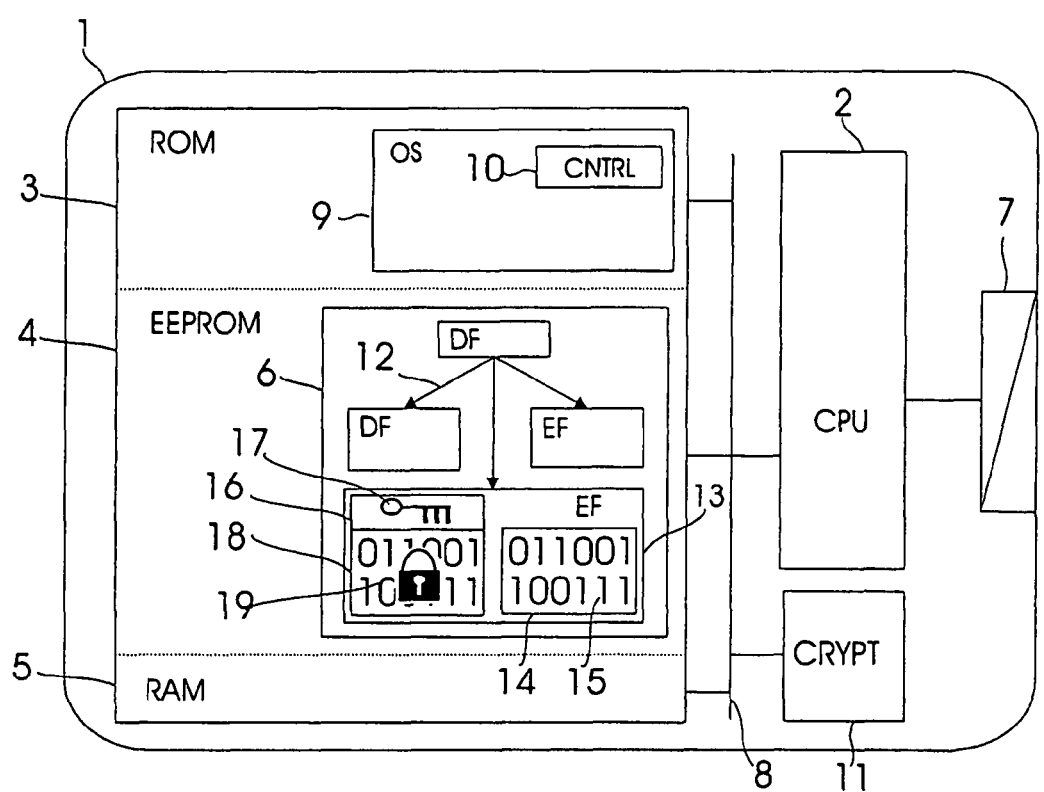
FIG. 3 shows a chip card according to the invention with local temporary memories and a hardware cryptographic functionality.

The arrangement of the key memory area 16 and the temporary memory area 18 in connection with the target memory area 14 can also be realized in a fashion deviating from the solution illustrated in FIG. 1. Concerning this FIG. 3 shows an embodiment in which the key memory areas 16 and temporary memory areas 18 are locally linked with the target memory area 14 of an EF file 13 in the memory area 6 for the file system 12. Here each target memory area 14 has associated therewith an individual temporary memory area 18 and a key memory area 16. This can be realized by a physically or logically contiguous memory area or address space, or the local memory areas 14, 16 and 18 can be associated with each other by logical operations.

Likewise, an arrangement can be expedient, in which the temporary memory area is locally disposed in the memory area 14 of the file 13, but the key memory area 17 is located globally outside the memory area 6. However, it is as well possible to dispose the key memory area locally within the memory area 14 of the file 13, while the temporary memory area 16 is formed as a global area outside the memory area 6 of the EEPROM memory 4.

The invention claimed is:

1. A method for secure processing of data in a portable data carrier, wherein the following steps are performed in the portable data carrier, which is a chip card having a processor:
   receiving data to be stored in the portable data carrier from an external terminal;

creating a cryptographic key including an encryption key and a decryption key, wherein the encryption key is identical to the decryption key or the encryption key is different from the decryption key;

encrypting the data to be stored using the encryption key;

temporarily storing the encrypted data and the cryptographic key in a temporary, non-volatile memory area of the portable data carrier;

decrypting the temporarily stored encrypted data using the decryption key; and copying the decrypted data from the temporary memory area to a target memory area of the non-volatile memory;

wherein:
in response to an interruption of the decrypting process and the decryption key being present in a non-volatile memory,
continuing the decrypting process of encrypted data, after the interruption has been removed, and
deleting the decryption key after the decrypting process has been entirely completed;
in response to an interruption of processing of the temporarily storing the encrypted data into a non-volatile memory,
deleting the cryptographic key to secure the encrypted data; and
in response to an interruption of processing by an interruption of a power supply of the portable data carrier and the decryption key being present in a volatile memory,
deleting the decryption key present in the volatile memory as a direct consequence of the interruption of the power supply, and
in response to the decryption key being present in a non-volatile memory,
deleting the decryption key after removal of the interruption.

2. The method according to claim 1, wherein the decryption of the encrypted data is effected immediately subsequent to the temporary storing of the encrypted data.

3. The method according to claim 1, wherein the decryption key is deleted after the proper completion of the processing.

4. The method according to claim 1, wherein, in case the temporary storing is interrupted, the decryption key is deleted.

5. The method according to claim 4, wherein, in case the temporary storing is interrupted, the decryption key is deleted by an active delete operation.

6. The method according to claim 5, wherein the deletion is effected with the occurrence of the interruption of the temporary storing or immediately after removal of the interruption of the temporary storing.

7. The method according to claim 1, wherein the target memory area is located within a memory area of a data system in the non-volatile memory of the portable data carrier.

8. The method according to claim 7, wherein the temporary memory area is locally formed within the memory area of the data system as a memory area associated with the target memory area.

9. The method according to claim 7, wherein the temporary memory area is globally formed outside the memory area of the data system as a reserved memory area.

10. The method according to claim 1, wherein the temporary memory area is formed as a temporary memory area whose data only the processing control can access.

11. The method according to claim 1, wherein the decryption key is stored in a key memory area of the temporary memory area.

12. The method according to claim 1, wherein the decryption key is stored in a key memory area outside the temporary memory area.

13. The method according to claim 1, wherein the encrypting and decrypting is carried out using a software module executable by a processor of the portable data carrier or of a hardware module of the data carrier.

14. A portable data carrier comprising:
a processor, and
a nonvolatile memory configured to store a processing control and a cryptographic function, the processing control and the cryptographic function being executable by the processor,
said processing control being arranged to:
receive data to be stored from an external terminal,
create a cryptographic key including an encryption key and a decryption key, wherein the encryption key is identical to the decryption key or the encryption key is different from the decryption key,
effect a temporary storing of the data to be processed and the cryptographic key in a temporary memory area of the data carrier in encrypted form, and
copy the temporarily stored data as decrypted data to a target memory area of the non-volatile memory; and
said cryptographic function being arranged to:
encrypt the data to be temporarily stored in the temporary memory area with the encryption key, and to
decrypt the encrypted data to be processed with the decryption key,
wherein:
in response to an interruption of the decrypting process and the decryption key being present in a non-volatile memory, the processing control is arranged to
continue the decrypting process of encrypted data, after the interruption has been removed, and
delete the decryption key after the decrypting process has been entirely completed;
in response to an interruption of processing of the temporarily storing the encrypted data into a non-volatile memory, the processing control is arranged to
delete the cryptographic key to secure the encrypted data; and
in response to an interruption of processing by an interruption of a power supply of the portable data carrier and the decryption key being present in a volatile memory, the processing control is arranged to
delete the decryption key present in the volatile memory as a direct consequence of the interruption of the power supply, and
in response to the decryption key being present in a non-volatile memory, the processing control is arranged to
delete the decryption key after removal of the interruption, and
wherein the portable data carrier is a chip card.

15. The portable data carrier according to claim 14, wherein the processing control is arranged to effect the decryption of the encrypted data immediately subsequent to the temporary storing of the encrypted data.

16. The portable data carrier according to claim 14, wherein the processing control is arranged to delete the decryption key with an active delete operation when an interruption of the temporary storing occurs.

17. The portable data carrier according to claim 16, wherein the processing control is arranged to delete the decryption key upon the occurrence of the interruption of the temporary storing or immediately after removal of an interruption of the temporary storing.

18. The portable data carrier according to claim 14, wherein in the non-volatile memory a memory area of a data system is formed and the target memory area is formed within this memory area.

19. The portable data carrier according to claim 18, wherein the temporary memory area is formed within the memory area of the data system and is associated with the target memory area as a local memory area.

20. The portable data carrier according to claim 18, wherein the temporary memory area is formed as a global memory area in the nonvolatile memory outside the memory area of the data system.

21. The portable data carrier according to claim 14, wherein the temporary memory area is formed as a temporary memory area whose data only the processing control can access.

22. The portable data carrier according to claim 14, wherein the key memory area is formed in the temporary memory area.

23. The portable data carrier according to claim 14, wherein the key memory area is formed outside the temporary memory area in the non-volatile memory.

24. The portable data carrier according to claim 14, wherein the cryptographic function is formed as an operating-system module or as a hardware module of the chip card.

25. The method according to claim 1, wherein the encryption key is identical to the decryption key.

26. The method according to claim 1, wherein the encryption key is different from the decryption key.

27. The portable data carrier according to claim 14, wherein the encryption key is identical to the decryption key.

28. The portable data carrier according to claim 14, wherein the encryption key is different from the decryption key.

\* \* \* \* \*